2 Sheets--Sheet 1.
W. P. CORSA.
Drier and Baker.
No. 164,974. Patented June 29, 1875.
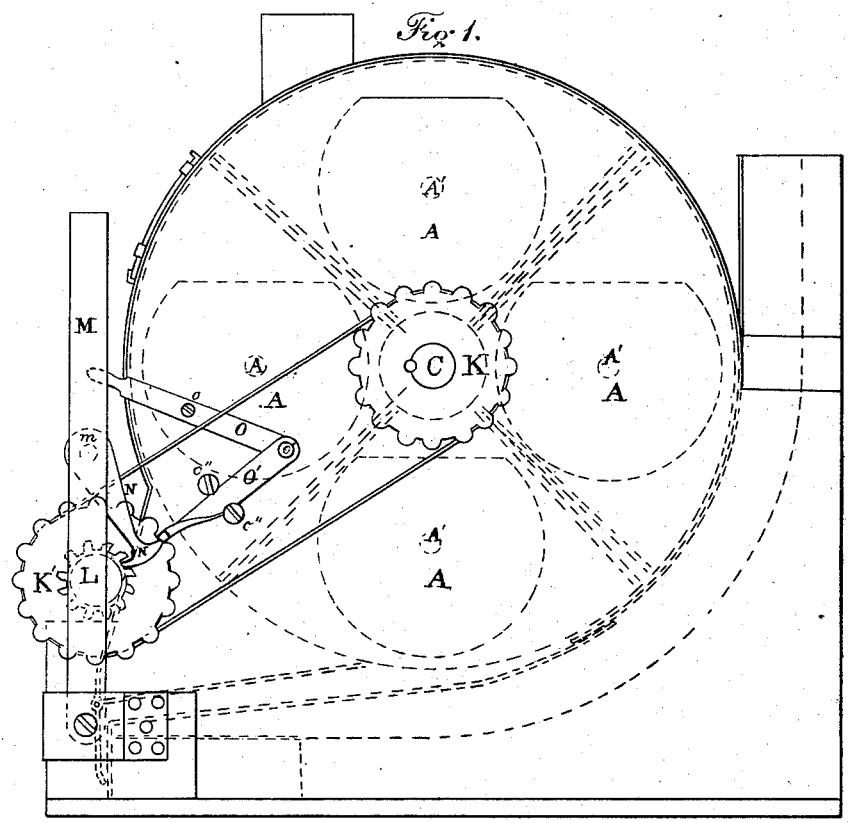
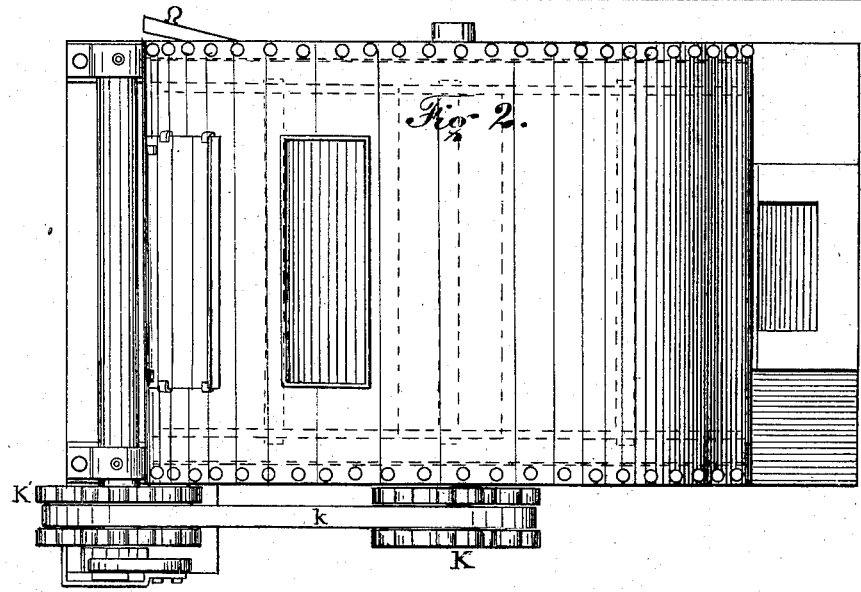
WITNESSES.
B. C. Pole
Yvon Pike
INVENTOR.
Wm P. Corsa
THE GRAPHIC CO.PHOTO-LITH.39 & 41 PARK PLACE,N.Y.

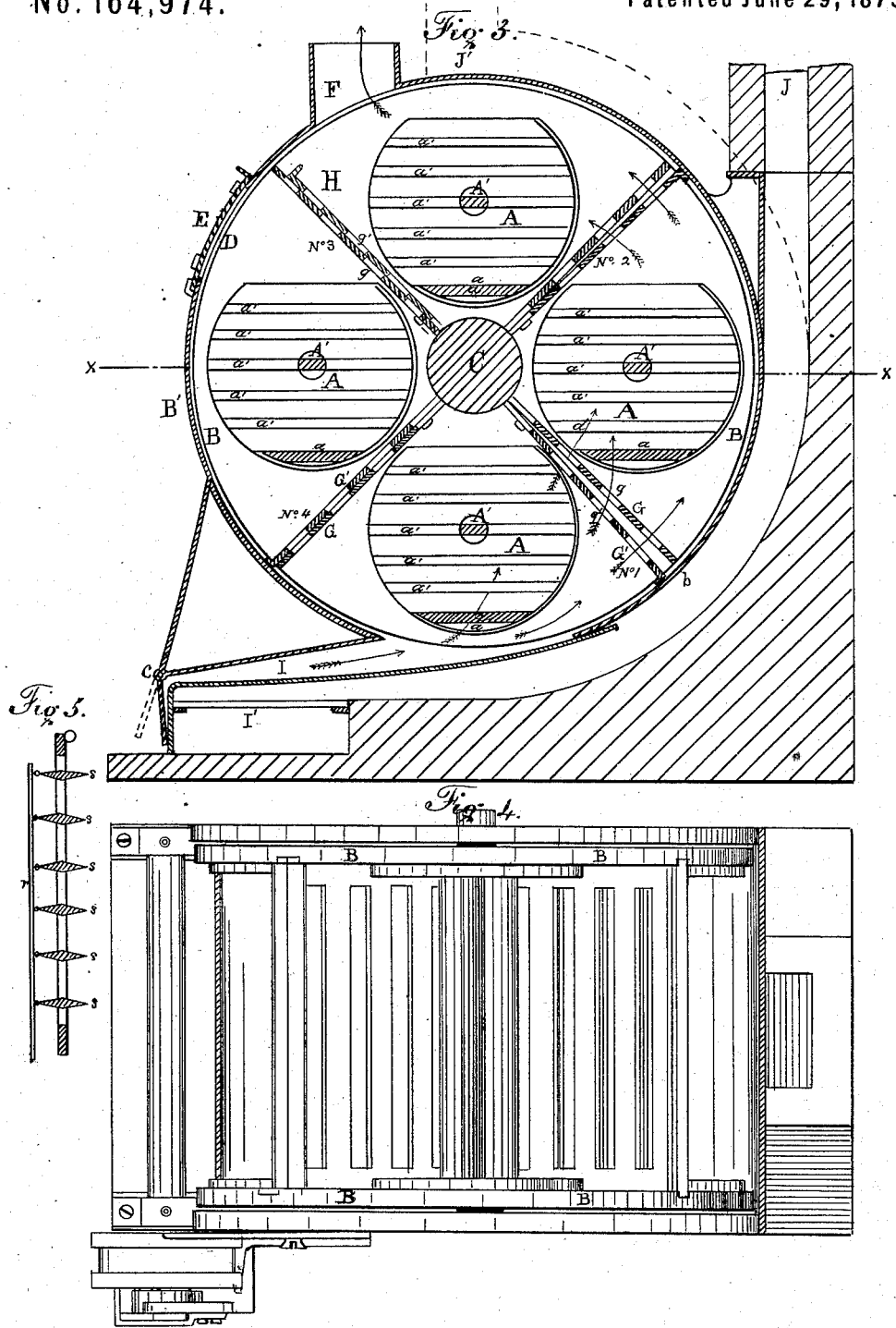

UNITED STATES PATENT OFFICE.

WILLIAM P. CORSA, OF MILFORD, DELAWARE.

IMPROVEMENT IN DRIERS AND BAKERS.

Specification forming part of Letters Patent No. 164,974, dated June 29, 1875; application filed January 25, 1875.

*To all whom it may concern:*

Be it known that I, WILLIAM P. CORSA, of Milford, in the county of Kent and State of Delaware, have invented an Improvement in Driers and Bakers; and I do hereby declare the following to be a full and exact description of the said invention, reference being had to the accompanying drawings, which form part of this specification, and are hereinafter described.

The nature and object of my invention are as follows, viz: The first part of my invention relates to the manner of arranging the trays of a drying apparatus in circular frames, so weighted as always to be maintained in a horizontal position, while the circular frames are carried around the main shaft of a rotary cylindrical hot-air furnace. The second part of my invention relates to the self-registering cut-off screens, which are open while passing partly around to let the hot air pass through them, but automatically close when near the doorway for the exit of the dried material. The third part of my invention relates to the adjustable entrance-door for the cold-air passage, for the purpose of regulating the heat, all of which will be more fully hereinafter explained.

In the drawings which accompany and form a part of this specification, Figure 1 is a side elevation of the drier or baker. Fig. 2 is a top view of the same looking down upon it. Fig. 3 is a section on line $x\ x$ of Fig. 2. Fig. 4 is an interior view of Fig. 2. Fig. 5 is a section of a modification of the screens or partitions shown at 1 2 3 4 in Fig. 3.

A A A A represent holders, which are hung upon pivots A' A', having at their lowest sides heavy weights $a\ a$, so that they will always remain, as shown in Fig. 3, with the bars in a horizontal position. These holders have in their ends recesses $a'\ a'\ a'$, &c., for the reception of trays in any number, as may be required, on which are placed fruits, vegetables, herbs, meat, fish, bread, or crackers, which are to be dried or baked, and which trays can be easily slipped into or out from the recesses. These holders are pivoted in the main frame of a rotary baker or drier, B, made of sheet metal, and which rotates upon a main axle, C, and within an outer shell of sheet metal, B', which has on the front side an opening, D, closed by a door, E; also, a hot-air-outlet flue, F, at the top. Within the baker or drier B are self-registering screens or partitions G, having openings $g$ at regular intervals, and over which are slide-plates G', with openings $g'$ corresponding with openings $g$, so that when these are opposite to each other the hot air can pass freely through them from one division or compartment to the other; but when the slide moves over the screen the openings are closed as at H, Fig. 3, in which figure it will be seen that the hot air passing from the space over the furnace-fire at I' to the right in the direction of the arrows, through screens Nos. 1 and 2, which have the passages open, is stopped at the screen No. 3, where, by its own weight, the slide G' has closed the register in G, and the air will pass into the outlet-flue above at F. These screens may be constructed as represented in Fig. 5, so that while in the position of Nos. 1, 2, and 4 they will be open, as in Fig. 5; but when at No. 3, (by the dropping down of rod $r$) the slats $s$ will close upon each other and shut off the hot air from the door D, when the trays with the dried material will be removed, and the fresh trays be put in, ready to be rotated onward down to the right, so that as each set of trays in the holder is brought to the door to be removed the freshly-supplied trays are passed onward to be subjected to the hot air, and at each successive renewal the holders pass around and are subjected to the heated air until reaching the door, where they may be removed in succession. I is an air-passage leading from the entrance-door at $c$, which is made adjustable to regulate the amount of air to be admitted. This air passes over the plate, which forms a covering to the furnace-fire at I' and the smoke-flue $b$. The hot air passes directly to the first holder, and is diffused among the trays, and so on through the screens Nos. 1 and 2, and to the outlet-flue F. This direction is due to the cut-off screen at H. The smoke and gases from the furnace are conducted along the flue $b$, as represented in the drawing, to the chimney at J in the rear, or yet farther around to J', as shown in dotted lines in Fig. 3. The main shaft or axle C has on its ends a wheel or pulley, K, from which a band, $k$, passes to a cogged wheel, K', on the end of a counter-shaft in front of the drier or baker. On the side of this latter wheel is a ratchet-wheel, L. Pivoted to the bottom frame is a lever, M, having pivoted at m a pawl, N, which by gravity engages with the teeth of ratchet L. The movement of lever M will propel the ratchet, and consequently the shaft and wheel K′, and the band k will turn the wheel K, the rotation of which will carry the tray-holders forward in the same direction that the hot air travels. They, being weighted below, will hang horizontally as they pass around, and keep the materials placed thereon in the proper place, as seen in Fig. 3. O is a hand-lever pivoted to the frame at o, and to which is pivoted a slide, O′, at o′, which slide moves between two screws, o″ o″. The lower end of O′ is made to engage with the cogs of wheel K′, and arrest its motion, and hold the driers in position desired, when the dried material is to be removed, and a fresh supply put in at the doorway D.

I do not claim the combination of cold-air and hot-air chambers in driers, as they have been heretofore used; but claim the particular features of my invention, which are the construction and continuation of the air-flue with relation to the smoke or hot-air passage, so that the cold air when entering may become gradually heated as it passes over the intermediate plate, and the combination of these with an adjustable register or gate to regulate the admission of the air, as required.

Having thus fully described my invention, what I claim, and desire to secure by Letters Patent, is—

1. A vertically-revolving drier and baker having a series of tray-holders pivoted and counterweighted, as shown and described, to maintain the trays in a horizontal position.

2. The registering screen or partition operating automatically, substantially as and for the purpose described.

3. The air-passage I, opening or entrance door c, and flue b, in combination with the drier B, substantially as and for the purpose described.

4. In a drier or baker, the combination of the swinging tray-holders, the self-registering and automatic partitions or screens, and the air and smoke passages, substantially as and for the purpose described.

WILLIAM P. CORSA.

Witnesses:
I. S. PRETTYMAN,
W. C. DAVIDSON.